United States Patent
Pfitzner et al.

[15] 3,657,117
[45] Apr. 18, 1972

[54] GEL CHROMATOGRAPHY

[72] Inventors: Klaus Pfitzner; Friedrich Kraffczyk, both of Darmstadt, Germany

[73] Assignee: Merck Patent Gesellschaft mit beschrankter Haftung, Darmstadt, Germany

[22] Filed: Dec. 22, 1969

[21] Appl. No.: 887,365

[30] Foreign Application Priority Data

Dec. 21, 1968 Germany..................P 18 16 380.9

[52] U.S. Cl.............................................210/31
[51] Int. Cl................................................B01d 17/06
[58] Field of Search................210/31, 198; 55/67, 197, 386

[56] References Cited

UNITED STATES PATENTS

| | | | |
|---|---|---|---|
| 3,298,925 | 1/1967 | Mosbach | 210/198 X |
| 3,369,007 | 2/1968 | Flodin | 210/31 X |
| 3,535,265 | 10/1970 | Baron et al | 210/198 X |

*Primary Examiner*—Charles N. Hart
*Attorney*—Millen, Raptes & White

[57] ABSTRACT

Cross-linked polymers suitable for gel chromatography are preferably prepared by pearl polymerization from hydroxyalkyl- or hydroxyalkoxyalkyl-acrylate or methacrylate monomers having up to 5 hydroxyl groups, at least one of which is acyl-substituted. The invention is directed to:

a. the monomers and their preparation;

b. formation of gels from the monomers; and c. use of the gels for gel chromatography.

43 Claims, No Drawings

GEL CHROMATOGRAPHY

BACKGROUND OF THE INVENTION

This invention relates to novel acrylate polymers suitable for gel chromatography. Gel chromatography is a well-known and well-established tool for the separation of components of chemical admixtures.

Various polymeric agents are already known for gel chromatography. To these belong, for example, cross-linked polystyrene, cross-linked polyvinyl acetate, cross-linked polymethyl methacrylate and cross-linked dextrans, celluloses, polysaccharides and polyvinyl alcohols. Cross-linked polymers of hydrophilic esters of methacrylic acid, for example, of β-hydroxyethyl methacrylate and diethylene-glycol dimethacrylate, have also already been used as agents for gel chromatography. However, such hydrophilic esters have the disadvantage that, because of their water solubility, they cannot be subjected to a suspension polymerization or can only be subject to such a polymerization with difficulty. Polymers based on glycidyl methacrylate are also known in the form of gels. Admittedly they yield pearl-like products but possess considerable disadvantages because of the great reactivity of the epoxy groups which lead to additional cross-linkages not only under the conditions of the polymerization but also by ring opening, which can be kept under control only with difficulty, if at all.

SUMMARY OF THE INVENTION

Particularly advantageous gels for chromatography are obtained from cross-linked polymers of methacrylic acid esters or of acrylic acid esters with polyols, the hydroxyl groups of which are at least partially protected by acyl groups. The gels thus obtained are suitable for chromatography in organic media and, after the partial removal of the protective groups, also for gel chromatography in aqueous media. In contradistinction to the usual hydrophilic gels, the partially acylated gels also swell in alcohols so that gel chromatographic separations in alcoholic and aqueous alcoholic media are also possible. Thus a graduated hydrolysis permits a continuous change over of the separation media from non-polar to polar solvents.

The new gels for gel chromatography are prepared from new monomers, the synthesis of which is also part of the subject invention.

An object of this invention is to obtain gels for gel chromatography which can be employed both in the hydrophobic region and also, after partial liberation of hydroxyl groups, in the hydrophilic region. Another object is to produce hydrophilic polymers useful for gel chromatography and which possess very great resistance to hydrolysis both in acidic and alkaline media. A further object is to prepare such gels which are resistant to bacterial attack. It is also an object to use water-insoluble monomers which are amenable to pearl polymerization. A still further object is to obtain polymeric gel having good mechanical properties and well-suited for column chromatography.

DETAILED DESCRIPTION OF THE INVENTION

Agents for gel chromatography are based on cross-linked polyacrylates or polymethacrylates; they consist of cross-linked polymers of monomers of the formula:

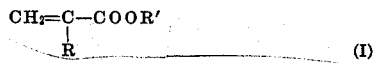

$$CH_2=C-COOR'$$
$$|$$
$$R$$
(I)

wherein R is a hydrogen atom or a methyl radical and R' is a straight or branched chain lower alkyl radical containing 2–6 carbon atoms, which can be interrupted by one or two oxygen atoms and which is substituted by up to and including 5 hydroxyl groups, preferably 1 to 3 groups, at least one of which is protected by an acyl radical. The new gels are preferably produced as pearl polymers.

Preferred examples for R' residues are, for example, 2-acetoxyethyl
3-acetoxy-2-hydroxy-propyl
2-acetoxy-3-hydroxy-propyl
2,3-diacetoxypropyl
1,3-diacetoxy-propyl
4-acetoxy-2,3-dihydroxybutyl
2,3-diacetoxybutyl
2 (2'-acetoxy-ethoxy)-ethyl
pentaerythritol triacetate
2-formyloxethyl
2,3-diformyloxypropyl
2,3-dipropionyloxypropyl
2,3-dibutyryloxypropyl
2-hydroxy-3-butyryloxypropyl
3-hydroxy-2-butyryloxypropyl
sorbitol pentaacetate
mannitol pentaacetate
ribitol tetraacetate Acyl radicals are the acid moieties of alkane carboxylic acids, more particularly of lower alkane carboxylic acids such as formyl, acetyl, propionyl and butyryl.

A process for the production of these agents for gel chromatography consists of subjecting monomers of the above-given general formula (I), in the usual manner, to a pearl polymerization and subsequently, if desired, hydrolyzing resulting polymers to split off some of the protective acyl radicals.

The present invention also provides new monomers of formula (I).

Monomers are hydroxyl group-containing monacrylates and/or monomethacrylates of formula (I), wherein the hydroxyl groups are wholly or partially protected by acyl groups which can easily be split off. Examples of particularly preferred monomers include the monoesters of methacrylic acid and of acrylic acid with ethylene glycol, glycerol, diethylene glycol, triethylene glycol and pentaerythritol, the hydroxyl groups of which are at least partially protected. Preferred protective groups are lower alkanoyl radicals, especially formyl, acetyl, propionyl and butyryl radicals. The acyl protective groups are incorporated in the monomer structures to make the monomers of formula (I) insoluble in water. Since, however, this object can also be achieved by only a partial acylation, unprotected, free hydroxyl groups can still be presented in the monomers of formula (I). As a rule, the number of protective groups necessary increases with the chain length of the acyl radical used.

Illustrative monomers are: 2-acetoxylethyl acrylate and methacrylate; 3-acetoxy-2-hydroxypropyl acrylate and methacrylate; 2-acetoxy-3-hydroxypropyl acrylate and methacrylate; 2,3-diacetoxypropyl acrylate and methacrylate; diacetin acrylate and methacrylate; 4-acetoxy-2,3-dihydroxybutyl acrylate and methacrylate; 2,3-diacetoxybutyl acrylate and methacrylate; 2-(2'-acetoxy-ethoxy) ethyl acrylate and methacrylate; pentaerythritol triacetate monoacrylate and monomethacrylate; 2-formyloxyethyl acrylate and methacrylate; 2,3-diformyloxypropyl acrylate and methacrylate; 2,3-dipropionyloxypropyl acrylate and methacrylate; 2,3-dibutyryloxypropyl acrylate and methacrylate; 2-hydroxy-3-butyryloxypropyl acrylate and methacrylate; and 3-hydroxy-2-butyryloxypropyl acrylate and methacrylate.

Of particular technical importance are the esters of acrylic and methacrylic acid with diacetin, especially of technical diacetin, which consists essentially of a mixture of 2,3-diacetoxypropanol and 1,3-diacetoxypropanol, as well as 2-acetoxyethyl methacrylate and 2,3-diacetoxypropyl methacrylate.

Of course, mixtures of the new monomers of general formula (I) are also useful for the production of the new gels.

Insofar as the new gels are subsequently used in a hydrophilic medium for chromatography, a part of the protective groups are eliminated, for example, by hydrolysis, preferably under alkaline conditions. However, in the case of such a saponification, at least about 1 percent of the acyl radicals originally present are maintained.

The new monomers of general formula (I) can be produced in per se known manner. They are obtained, for example, from the monomethacrylates or acrylates of the corresponding polyhydroxy compounds by the action of conventional acylation agents, such as acid anhydrides or acid halides, or of the corresponding carboxylic acids, in the presence of a conventional catalyst, such as sulfuric acid, perchloric acid, p-toluene-sulfonic acid or an acidic ion exchanger, such as a polystyrene-sulfonic acid exchanger.

Monomers of formula (I) are also obtained by the esterification of acrylic acid or methacrylic acid or of derivatives thereof suitable for esterification, with the polyhydroxy compounds, the hydroxyl groups of which are already protected in the desired manner by radicals which can easily be split off. Thus, for example, acrylic or methacrylic anhydride can be reacted with partially protected polyols, for example, with a glycerol diacetate, 3-acetoxy-2-hydroxypropanol, 4-acetoxy-2,3-dihydroxybutanol, the monoacetates of mono-, di- and triethylene glycols, pentaerythritol triacetate or technical diacetin. The reaction of acrylic or methacrylic acid chloride with at least partially acylated polyols in the presence of bases, such as triethylamine, pyridine, and $K_2CO_3$, or of the corresponding acid anhydrides in the presence of pyridine, is preferred.

A further method for the production of the new monomers of general formula (I) is the transesterification of methyl acrylate or methacrylate with partially acylated polyols in the presence of known transesterification catalysts, for example sodium methylate.

A number of these compounds can also be easily obtained by the reaction of epoxy group-containing methacrylates or acrylates with carboxylic acids and/or acid anhydrides in the presence of acidic catalysts. Thus, for example, the reaction of glycidyl methacrylate with acetic acid/sulfuric acid gives, depending upon the reaction conditions used, 2-hydroxy-3-acetoxypropyl methacrylate (and/or the related isomeric 2-acetoxy-3-hydroxypropyl methacrylate) or 2,3-bis-acetoxypropyl methacrylate. Instead of glycidyl methacrylate, other epoxy group-containing monomers can also be used for this reaction, for example, 2,3-epoxybutyl methacrylate and 2,3-epoxy-2-methylpropyl methacrylate, as well as the corresponding acrylates. Instead of acetic acid, there can, of course, also be used other alkane-carboxylic acids, such as propionic acid or butyric acid or the anhydrides thereof, as well as formic acid.

Normally, a polymerization inhibitor, such as hydroquinone, is added during the course of the reaction.

The working up and isolation of the reaction products takes place in known manner.

The production of the gels takes place in known manner. The pore structure of the pearl polymers is regulated by the content of cross-linking agent, which leads to gels with swelling porosity but, on the other hand, also by the addition of inert diluents, polymers with macroporous structure thereby being obtained.

As cross-linking agents, there can be used compounds containing two or more vinyl groups, for example, bis-methacrylates or bis-acrylates of di- or polyols, for example, ethylene glycol bis-methacrylate or acrylate, diethylene glycol bis-methacrylate or acrylate, triethylene glycol bis-methacrylate or acrylate, 2,2-dimethylpropane-1,3-diol bis-methacrylate or acrylate, butane-1,4-diol bis-methacrylate or acrylate, hexane-1, 6-diol bis-methacrylate or acrylate; or divinylbenzene; divinylpyridine; divinyl ethers, for example, ethylene glycol divinyl ether or butane-1,4-diol divinyl ether; or diallyl esters, for example, diallyl phthalate; or divinyl esters, for example, adipic acid divinyl ester; or other compounds with two or more non-conjugated double bonds, such as allyl acrylate, allyl methacrylate, allyl methacrylamide, N,N-methylene-bis-acrylamide, vinyl methacrylate, diallyl-dimethylsilane or diallyl sulphone; or mixtures of these compounds. The diallyl esters and the divinyl esters are, however, only used when a subsequent saponification of the gels is not intended.

Preferred cross-linking agents are the diesters of methacrylic acid or of acrylic acid with polyols containing up to 6 carbon atoms, for example, ethylene glycol, propylene glycol, butane-1, 4-diol and hexane-1, 6-diol. Of course, several of these cross-linking agents can be used in combination.

The amount of the cross-linking agent used is responsible for the porosity of the gels obtained. The content of the cross-linking agent can, therefore, be varied within wide limits, depending upon the desired properties of the gels. Thus, 0.01–70 percent by weight of cross-linking agent can be added, referred to the total amount of mixture to be subjected to polymerization. For gels with usual swelling porosities, as a rule there are selected amounts of 0.01–20 percent by weight, preferably of 0.1–10 percent by weight, of cross-linking agent, while for macroporosities, there can be used amounts of about 5–70 percent by weight, preferably of 10–50 percent by weight, of cross-linking agent.

The production of the cross-linked co-polymers can be carried out by all the conventional methods. Thus, the polymerization can be carried out, for example, in substance, in emulsion or as a precipitation or pearl polymerization. The pearl polymerization is preferably used since, in this case, the particle size of the gel can be controlled ab initio and thus losses, which otherwise arise by comminution and sieving, are avoided. Furthermore, gels produced by pearl polymerization give a better column packing. The preferred particle size of the gels (diameter) is, depending upon the intended field of use, between 0.001 and 2 millimeters (mm.), preferably between 0.01 and 0.5 mm., in a non-swollen state. The bulk density of the gels obtained varies between 1.0 and 5.0 milliliters per gram (ml./g.).

In addition, production of the gel by pearl polymerization makes it possible to carry out the polymerization as an oil-in-water polymerization which is technically easier to control than polymerization in the reversed phase distribution which is, for example, the only one possible in the case of a subsequent cross-linking of polyvinyl alcohol.

The pearl polymerization itself can be effected by all of the conventional processes described in literature. Free radical initiation is frequently preferred; it can, for example, be brought about by oxidation agents, such as peroxides, especially dibenzoyl peroxide, dilauroyl peroxide or di-o-tolyl peroxide, or also by such as azoisobutyrodinitrile. Redox initiation is also possible, for example, by the use of the system sodium dithionite/alkali metal, e.g. sodium, peroxydisulfate. The initiators are used in the usual manner, in concentrations of 0.01 to 10 percent, preferably of 0.1 to 2 percent. The pearl polymerization itself is generally carried out in the temperature range of about 20° C. up to the boiling point of the lowest boiling monomer, preferably at about 40° to 90° C. The pearl polymerization is carried out particularly advantageously at pH values between 5 and 8.5, preferably at about 7.5. It has proved to be expedient to add buffer substances, for example a phosphate buffer, during pearl polymerization. The usual phosphate buffers are mixtures of alkali metal, especially sodium, hydrogen phosphates and dihydrogen phosphates.

When carrying out the polymerization, conventionally employed surface-active materials, i.e. in the case of emulsion polymerizations preferably ionic substances, for example water-soluble colloids, such as soaps or paraffin sulfonates, in usual concentrations of 0.01 to 10 percent, preferably of 0.1 to 2 percent, can be added. In the case of pearl polymerizations, water-soluble colloids are generally preferred, especially polyvinyl alcohol or partially saponified polyvinyl acetate, polyvinyl pyrrolidone, starch, pectins and the like substances known for this purpose. In this case the preferred concentrations are about 0.01 to 10 percent, more preferably 0.05 to 3 percent, the basis of the ratio, e.g. volume or weight.

The ratio of organic to aqueous phase is, in the case of pearl polymerization, in general between 1:1 and 1:20, preferably between 1:2 and 1:5.

By variation of the polymerization conditions, it is possible to influence the pore size of the compounds according to the present invention. An important possibility is the variation of the concentration of the cross-linking agent added. With an increasing amount of cross-linking agent, the gels become less swellable and their form stability is increased.

A further possibility for influencing the formation of the pores is, especially in the case of pearl polymerization or in the case of polymerization in substance, the addition of certain substances, which are added before or during the polymerization. Particularly preferred for this purpose are those diluents which are solvents for the monomers used and swelling agents for the resultant polymers, for example ethyl acetate, benzene or toluene; other such substances include those which are solvents for the monomers but are precipitants for the polymers. To these belong, for example, aliphatic hydrocarbons, such as octane, dodecane and petroleum ether, and also alcohols, especially alkanols, such as hexanol, octanol, decanol, heptanol and amyl alcohol, as well as ethers particularly lower alkylethers, such as dibutyl ether. Several such solvents can also be used simultaneously. However, inert materials can also be incorporated into the polymers without chemical bonding; these are subsequently removed from the gel. For this purpose, there can be used, for example, polymers, such as polystyrene, as well as insoluble salts, such as alkaline earth metal carbonates, especially calcium carbonate.

The additional materials must, of course, be adjusted to the other polymerization conditions, especially to the solvents and/or precipitating agents and/or suspension agents used. Depending upon the desired pore size of the gel, various additives of this type can, of course, also be used simultaneously.

By means of these additives, the most varied exclusion limits can be achieved. The exclusion limit is a measure of the pore diameter of a gel, usually given as the molecular weight of the smallest molecule which can just no longer penetrate into the pores of the gel. Thus, by the addition of precipitation agents/solvents, exclusion limits which correspond to molecular weights of up to about $10^{10}$, preferably $10^3$ to $10^8$, can be achieved. The addition of soluble polymeric substances enables the production of gels with exclusion limits which lie in the order of the molecular weight of the initially incorporated polymers. By the addition of solid substances, which are removed after the production of the gel, it is, however, also possible to produce gels with substantially higher exclusion limits.

The properties of the polymers according to the present invention can be substantially altered by partial hydrolysis and, in particular, can be made hydrophilic. The protective groups are thereby partially split off and the hydroxyl groups liberated. However, only a partial saponification is carried out so that the hydrophilic gels according to the present invention always contain at least 0.3 percent by weight of acyl radicals. At least 1 percent of the acyl radicals originally present in the monomers are retained.

The saponification can be carried out in alkaline or acidic media. In most cases, an alkaline saponification is preferred. It is expediently carried out with alcoholic alkali, preferably with methanolic or ethanolic solutions of alkali metal, e.g. sodium and potassium, or alkaline earth metal, e.g. calcium, hydroxides. Besides methanol and ethanol, other alcohols, especially isopropanol, can, of course, also be used, as well as aqueous alcohols. The gels are either left to stand with the alkali for several days at ambient temperature or the gels are boiled under reflux for a period of from a few minutes to several hours. The saponification can also be carried out in purely aqueous solutions, but the saponification times then needed are substantially longer. An acidic saponification is carried out, for example, in aqueous solution with the addition of strong acid, for example hydrochloric acid, sulfuric acid, hydrobromic acid, phosphoric acid or p-toluene-sulfonic acid. If the reaction is carried out at an elevated temperature, for example of about 100° C., then the acid can be used in comparatively low concentrations, while in the case of comparatively high concentrations (15–20 percent), the saponification also takes place at lower temperatures (20°–60° C.).

Saponification in which a substantial part of the protective groups are to be retained are carried out in the presence of aqueous lower aliphatic alcohols, preferably methanol and/or ethanol. The amount of the alcohol added and the reaction times influence the hydrolysis in known manner; lower alcohol concentrations and/or reduced reaction times (depending upon the reaction conditions, from 5 minutes to 2 hours) lead to less saponified products.

The agents obtained according to the present invention are normally insoluble in the usual solvents. The organophilic gels are readily swellable in most organic solvents. An exception to this is the saturated hydrocarbons which do not bring about any swelling or only a slight swelling.

After the hydrolysis, the gels are swellable, especially with water and also with the lower alcohols. They are thereby able to take up several times their own volume of liquid by swelling. The new gels have swelling factors of between 2 and 20 ml./g., preferably between 2 and 10 ml./g.

The gels according to the present invention are useful for practically all separations for which a gel-permeation chromatography can be considered. As is known, a molecular weight-dependent separation thereby takes place. Molecules above a certain particle size (exclusion limit) cannot penetrate at all into the pores of the gel and possess an elution volume which corresponds to the spaces between the gel particles. Substances with a molecular weight in the region of or below the exclusion limit of the gel in question are, in general, more slowly eluted the smaller their molecular weight.

The new gels are useful, for example, for the separation of substances with very widely distributed molecular weights. The gel is selected with regard to the intended field of use, i.e. with regard to the substances to be separated, the desired separation capacity and the filter velocity. Not only low molecular weight substances, but also high molecular weight substances can be separated with the new gels according to the present invention.

The new gels are especially suitable for the separation of substances with molecular weights above 500, for example above 1,000, because such substances are very often difficult to separate by other methods.

Special uses of the new gels are, for example, the determination of the molecular weight distribution of polymers. In the oligomeric range, substances can be isolated with molecular uniformity. Thus, for example, oligophenylenes, oligourethanes, oligoethylene glycols and oligostyrenes can be separated into fractions of molecular uniformity. In the case of polymers, for example polystyrene, polyvinyl acetate or polyvinyl chloride, the molecular weight distribution can be determined, or fractions with only a slight non-uniformity can be obtained on a preparative scale.

The new gels are advantageously also used for the separation of colloidal substances from substances in true solution, especially for the separation of sensitive colloids, for example, enzymes or viruses. Advantages are also obtained in the case of the treatment of mixtures which contain proteins or polypeptides, for example, plasma protein, enzymes, such as pepsin or pancreas enzyme, or hormones, for example insulin. The separation of polysaccharides, such as amylodextrins, heparin and amyloses, can also be effected.

The new gels are also used for the separation of complicated mixtures which contain several compounds of different types, for example biological fluids, such as plant extract or extracts from micro-organisms or animal organs. In this case, both separation and purification can be accomplished. By way of example, the fractionated separation of blood plasma, sera, enzymes and other proteins, peptides, nucleic acids, vitamins, co-enzymes, hormones, antibiotics, alkaloids and carbohydrates can be performed.

The hydrophilic gels are particularly suitable for the separation of high molecular weight and ionic substances, for example for the desalination of proteins, which can be carried out quantitatively and without loss, the high molecular weight components being eluted n the first fractions of the gel chromatography.

In a similar manner, for example, high molecular weight natural materials, such as proteins, carbohydrates and nucleic acids, can be transferred from one ionic medium into another ionic medium. In this case, not only the nature of ions, but also their concentration and/or pH value of the solution, can be changed.

The technique of using the new gels according to the present invention does not differ from that of the known stationary phases in gel chromatography. Usually, the gels are packed into columns through which eluents flow upwardly or downwardly. Frequently, it is expedient to allow the solvent to flow through the column during the packing thereof with the gel in order to achieve a uniform packing of the gel thereby. The gel must be swollen until a state of equilibrium is reached. Normally, the same solvent is used for this pre-swelling as is intended for the subsequent elution. Sometimes, in order to save time, it is expedient to carry out the chromatography under pressure. The use of elevated temperatures, for example of 30°–150° C., during the chromatography also permits the separation of substances, the solubility of which is low at ambient temperature.

Of course, the most varied mixtures of the new gels can be used for the chromatography. Such mixtures are, for example, especially desirable when a broader pore size distribution is to be achieved; a greater range of molecular weights can also be included. This can, for example, be the case in the separation of polymers with high and low molecular weight components.

All compounds of formula (I) are prepared from known starting materials according to procedures herein described and/or exemplified. Likewise, the novel agents for gel chromatography are prepared from the monomers in the described manner and are used as indicated according to known procedures.

In the examples, as well as throughout the specification, all percentages, parts and ratios are by weight unless otherwise specified; all yields are based on the weight of starting monomer of formula (I), unless otherwise specified. The polyvinyl pyrrolidone preferably has an average molecular weight of at least 20,000.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

A. Production of the Gels

EXAMPLE 1 a. A mixture of 294 g. 2,3-diacetoxy-propyl methacrylate, 6 g. butane-1,4-diol dimethacrylate and 1.2 g. azo-isobutyrodinitrile is added, with vigorous stirring, to a solution of 6 g. disodium hydrogen phosphate, 0.35 g. sodium dihydrogen phosphate, 120 g. sodium chloride and 6.0 g. polyvinyl pyrrolidone in 1,200 ml. water. The milky suspension if slowly heated to 75° C. over the course of 2 hours and then maintained at this temperature for a further 2 hours. Subsequently, the reaction mixture is poured into water. The pearl polymer formed precipitates out. Fine material is separated off by repeated decanting. After drying, 80–95 percent of clear polymer pearls are obtained. The swelling factor (tetrahydrofuran) is 3.7 ml./g. The exclusion limit is about 1,200, determined with oligophenylenes and polystyrenes in tetrahydrofuran.

b. 100 g. of the gel produced in Example 1(a) are placed in 500 ml. methanol which contains 5 g. potassium hydroxide and stirred for 3 hours at ambient temperature. The gel is filtered off and washed until neutral. After drying, it has a weight of 68 g. The swelling factor (water) is 3.4 ml./g.; acetyl content: 0.5 percent by weight.

EXAMPLE 2

294 g. 2,3-diacetoxy-propyl acrylate are subjected to a pearl polymerization in a manner analogous to that described in Example 1(a). A product which is very similar to that of Example 1(a), with a swelling factor of 4.1 ml./g. (tetrahydrofuran), is obtained. The exclusion limit is about 1,500, determined with oligophenylenes and polystyrenes in tetrahydrofuran.

EXAMPLE 3 a. A mixture of 299.7 g. 2,3-diacetoxy-propyl methacrylate, 0.3 g. ethylene glycol bis-methacrylate and 0.1 g. azo-isobutyrodinitrile is added, with stirring, to a solution of 6 g. polyvinyl pyrrolidone, 6 g. disodium hydrogen phosphate and 0.35 g. sodium dihydrogen phosphate in 1,200 ml. water. The suspension is heated, while stirring uniformly, to 50°–70° C. Within the course of two hours and then to 80° C. within the course of a further 3 hours. The reaction mixture is subsequently poured into ice water. The fine material is discarded by repeated decanting. The yield of clear pearls is 77 percent. The dry bulk density is 1.0 ml./g. The swelling factor is 7.0 ml./g. (tetrahydrofuran). The exclusion limit, determined with polystyrenes and oligophenylenes, is 3,500.

b. 100 g. of the gel produced in the manner described in Example 3(a) are saponified in a manner analogous to that described in Example 1(b). The yield is 70 g. the dry bulk density is 1.3 ml./g. The swelling factors are 4.6 ml./g. (water) and 4.3 ml./g. (methanol). The exclusion limit, determined with enzymes and peptides, is 3,700.

EXAMPLE 4 a. A mixture of 162 g. 2-hydroxy-3-acetoxypropyl methacrylate, 18 g. ethylene glycol bis-methacrylate, 220 g. toluene and 1 g. azoisobutyrodinitrile is added to a solution of 12 g. polyvinyl pyrrolidone, 6 g. disodium hydrogen phosphate and 0.35 g. sodium dihydrogen phosphate in 1,200 ml. water. The reaction mixture is heated up in the manner described in Example 3(a) and poured into water. After precipitation of the polymer, it is decanted and washed out several times with methanol in order to remove the diluent. The yield is 75 percent. The dry bulk density is 1.7 ml./g. The swelling factor is 6.0 ml./g. (tetrahydrofuran). The exclusion limit, determined with polystyrenes and oligophenylenes in tetrahydrofuran, is 20,000.

b. 100 g. of the gel produced in the manner described in Example 4(a) are saponified in the manner described in Example 1(b). The yield is 73.7 g. The dry bulk density is 1.50 ml./g. The swelling factors are 5.0 ml./g. (water) and 5.6 ml./g. (methanol). The exclusion limit, determined with enzymes and peptides, is 60,000.

EXAMPLE 5 a. A mixture of 144 g. $\beta$-formyloxyethyl methacrylate, 36 g. ethylene glycol bis-methacrylate, 66 g. octanol, 154 g. toluene and 1 g. azo-isobutyrodinitrile is added to a solution of 12 g. polyvinyl pyrrolidone, 6 g. disodium hydrogen phosphates and 0.35 g. sodium dihydrogen phosphate in 1,200 ml. water. The mixture is heated up in the manner described in Example 2(a) and then worked up in the manner described in Example 4(a). The yield is 82 percent. The dry bulk density is 1.3 ml./g. The swelling factor is 4.7 ml./g. (tetrahydrofuran). The exclusion limit, determined with polystyrene in tetrahydrofuran, is 25,000.

A reaction mixture with 2-acetoxyethyl methacrylate instead of $\beta$-formyloxyethyl methacrylate gives a product with practically the same properties.

b. 70 g. of the gel produced according to Example 5(a) are saponified in a manner analogous to that described in Example 1(b). The yield is 52.3 g. The dry bulk density is 1.4 ml./g. The swelling factors are 4.7 ml./g. (water) and 5.0 ml./g. (methanol). The exclusion limit, determined with enzymes and peptides, is 75,000.

EXAMPLE 6 a. A mixture of 126 g. of 2,3-diacetoxy-propyl methacrylate, 54 g. of hexane-1,6-diol bis-methacrylate, 110 g. of octanol, 110 g. of petroleum ether (b.p. 140° C.) and 1 g. of azoisobutyrodinitrile is added to a solution of 12 g. of polyvinyl pyrrolidone, 6 g. of disodium hydrogen phosphate and 0.35 g. of sodium dihydrogen phosphate in 1,200 ml. of water. The reaction and working up are carried out in the manner described in Example 5(a). The yield of cloudy pearls is 74 percent. The bulk density is 1.7 ml./g. The swelling factor is 5.7 ml./g. (tetrahydrofuran). The exclusion limit, determined with polystyrenes, is 200,000.

b. 100 g. of the gel produced according to Example 6(a) are saponified in a manner analogous to that described in Example 1(b). The yield is 71 g. The bulk density is 1.4 ml./g. The swelling factors are 5.3 ml./g. (water) and 5.7 ml./g. (methanol). The exclusion limit, determined with enzymes and peptides, is 1,000,000. The acetyl content is 0.8 percent by weight.

EXAMPLE 7 a. A mixture 202.5 g. of 2-acetoxy-ethyl methacrylate, 22.5 g. of ethylene glycol bis-methacrylate, 275 g. of toluene and 1 g. of aziosobutyrodinitrile is added to a solution of 20 g. of polyvinyl pyrrolidone, 5 g. of disodium hydrogen phosphate and 0.30 g. of sodium dihydrogenphosphate in 1,000 ml. of water. The polymerization and working up take place in the manner described in Example 6(a). The yield is 85 percent of slightly cloudy pearls. The bulk density is 1.7 ml./g. The swelling factor is 5.3 ml./g. (tetrahydrofuran). The exclusion limit, determined with polystyrene in tetrahydrofuran, is 40,000.

A reaction mixture with 2-(2-acetoxy)-ethoxyethyl methacrylate instead of 2-acetoxyethyl methacrylate gives a product with practically the same characteristics: bulk density 1.8 ml./g.; swelling factor 5.8 ml./g. (tetrahydrofuran).

b. 50 g. of the gel produced according to Example 7(a) are saponified in a manner analogous to that described in Example 1(b). The yield is 41.8 g. The bulk density is 1.5 ml./g., the swelling factor is 5.0 ml./g. (water) and the exclusion limit, determined with enzymes and peptides, is 80,000.

EXAMPLE 8 a. A mixture of 240 g. 2,3-diacetoxy-propyl methacrylate, 60 g. ethylene glycol bis-methacrylate, 100 g. octanol and 2 g. azoisobutyrodinitrile is added to a solution of 6 g. polyvinyl pyrrolidone, 6 g. disodium hydrogen phosphate and 0.35 g. sodium dihydrogen phosphate in 1,200 ml. water. The polymerization and working up are carried out in the manner described in Example 6(a). The product obtained has a bulk density of 1.33 ml./g. and swelling factors of 2.8 ml./g. (tetrahydrofuran), 2.6 ml./g. (methanol) and 1.6 ml./g. (water).

b. 30 g. of the gel obtained according to Example 8(a) are stirred for 3 hours at ambient temperature in 150 ml. 50 percent aqueous methanol containing a stoichiometric amount of potassium hydroxide. After working up in the usual manner, a hydrophilic gel with an acetyl content of 0.6 percent by weight is obtained. The bulk density is 1.33 ml./g. The swelling factors are 1.8 ml./g. (tetrahydrofuran), 3.2 ml./g. (methanol) and 3.0 ml./g. (water).

c. 30 g. of the gel obtained according to Example 8(a) are stirred for 3 hours at ambient temperature in 150 ml. of 1 N aqueous sodium hydroxide solution. After working up in the usual manner, a gel with an acetyl content of 18.3 percent by weight is obtained. The bulk density is 1.45 ml./g. The swelling factors are 3.2 ml./g. (tetrahydrofuran), 3.0 ml./g. (methanol) and 2.0 ml./g. (water).

d. 30 g. of the gel obtained according to Example 8(a) are stirred for 3 hours at ambient temperature in a mixture of 75 ml. tetrahydrofuran and 75 ml. aqueous 1 N sodium hydroxide solution. After working up in the usual manner, there is obtained a gel with an acetyl content of 14.2 percent by weight. The bulk density is 1.4 ml./g. The swelling factors are 3.3 ml./g. (tetrahydrofuran), 3.0 ml./g. (methanol) and 2.3 ml./g. (water.).

B. Use of the Gels

EXAMPLE 9

Separation of Proteins on a Gel with a High Exclusion Limit

The gel produced according to Example 6(b) is left to swell overnight in a phosphate-citrate buffer of pH 5. The gel is then packed into a column of about 600 mm. length and 11 mm. diameter in the usual manner. The proteins to be chromatographed are dissolved in 0.5 ml. of buffer solution and applied to the column. Elution is carried out with the mentioned buffer at a rate of 18 ml./hr. The examination of the eluate is carried out in the usual manner by measurement of the ultraviolet absorption in dependence upon the elution volume.

The following elution volumes are obtained:

| | | | |
|---|---|---|---|
| glutamate dehydrogenase | M.W. | 1,000,000 | 20 ml. |
| lipoxidase | M.W. | 120,000 | 30 ml. |
| RNAse | M.W. | 13,000 | 33 ml. |
| tyrosine | M.W. | 182 | 45 ml. |

The exclusion molecular weight of the gel for enzymes/proteins is $1 \times 10^6$.

EXAMPLE 10

Separation of Polyglycols on a Gel with a Low Exclusion Limit

The gel prepared according to Example 3(b) is swollen in the manner described in Example 9 and packed into a column with a length of 600 mm. and a diameter of 9 mm. The column is attached to an apparatus which permits a detection of the substances to be chromatographed with a differential refractometer. Such apparatus is well-known. Polyglycols are dissolved in a phosphate-citrate buffer (10 mg./ml.). 30 microliters (ul.) amounts are injected into the apparatus. Elution is carried out with the mentioned buffer.

The following elution volumes are obtained:

| | | | |
|---|---|---|---|
| polyglycol | M.W. | 20,000 | 17 ml. |
| polyglycol | M.W. | 6,000 | 17 ml. |
| polyglycol | M.W. | 4,000 | 16.5 ml. (Main peak) |
| polyglycol | M.W. | 1,500 | 22 ml. |
| polyglycol M.W. | | 1,000 | 24 ml. |
| polyglycol | M.W. | 400 | 27 ml. |
| ethylene glycol | M.W. | 62 | 34 ml. |

The exclusion molecular weight for polyglycols is 4,500.

C. Production of the Monomers

EXAMPLE 11

2-Acetoxyethyl Methacrylate a. 1.37 kg. 2-hydroxyethyl methacrylate are stirred for 6 hours at ambient temperature with 4 kg. acetic anhydride, 40 ml. concentrated sulfuric acid and 30 g. tert.-butylpyrocatechol, as stabilizer. The reaction mixture is thereafter poured into water and extracted twice with petroleum ether (b.p. 40° C.). The combined extracts are washed with water until neutral and then dried over anhydrous sodium sulfate. After stripping off the petroleum ether, a pale colored residue is obtained which is distilled under reduced pressure. 2-acetoxyethyl methacrylate with a boiling point of 63°–65° C./0.05 mm. Hg is thus obtained.

Instead of sulfuric acid, pyridine can be used as catalyst.

b. A mixture of 130 g. 2-hydroxyethyl methacrylate, 240 g. glacial acetic acid, 5 ml. concentrated sulfuric acid and 0.13 g. hydroquinone is stirred for 2 hours at ambient temperature and subsequently mixed with 1 liter of diethyl ether. The ethereal phase is shaken out with water three times. After drying and distilling off the ether, a pale colored oil remains behind, which is chromatographically pure and thus can be used for further polymerizations.

EXAMPLE 12

2-Formyloxethyl Methacrylate 650 g. 2-hydroxyethyl methacrylate, 800 g. formic acid, 10 g. p-toluene-sulfonic acid and 0.65 g. hydroquinone is stirred for 2 hours at ambient temperature. The reaction mixture is then taken up in 3 liters of diethyl ether and washed neutral with an aqueous solution of sodium bicarbonate and water. After drying the solution and evaporating the solvent, there remains behind a slightly viscous oil which is fractionally distilled under reduced pressure. 2-formyloxyethyl methacrylate, which has a boiling point of 90°–92° C./9 mm. Hg, is thus obtained.

For many cases, the product can be used for polymerization without previous distillation.

EXAMPLE 13

2,3-Diacetoxypropyl Methacrylate a. 1420 g. methacrylic acid glycide ester are added dropwise, with stirring, to a mixture of 2,700 g. acetic acid, 80 g. concentrated sulfuric acid and 45 g. hydroquinone, the temperature thereby increasing to 90° C. Thereafter, 1,020 g. acetic anhydride are added dropwise within the course of an hour, the temperature being maintained at 95° C. Excess acetic acid is then distilled off under reduced pressure. The oily, dark colored residue is poured into 4 liters of ice water and well stirred. The crude product is separated. The aqueous phase is shaken out twice with 1 liter amounts of chloroform and the extract combined with the crude product. After washing with a 5 percent solution of potassium hydroxide, it is washed neutral with water. After drying and distilling off the chloroform, 2,350 g. of a yellowish oil remain which is pure enough for polymerization. A chromatographically pure material is obtained by distillation with the addition of hydroquinone. 2,3-Diacetoxypropyl methacrylate has a boiling point of 122°–125° C./0.1 mm. Hg.

b. Under the same conditions, from glycidyl methacrylate, propionic acid, sulfuric acid and propionic anhydride, there is obtained 2,3-di-(propionyloxy)-propyl methacrylate, which has a boiling point of 136°–138° C./0.05 mm. Hg.

c. Under the same conditions, from glycidyl acrylate, acetic acid, sulfuric acid and acetic anhydride, 2,3-diacetoxypropyl acrylate, which has a boiling point of 110°–112° C./0.05 mm. Hg., is obtained.

d. Under similar conditions, from glycidyl methacrylate, formic acid and p-toluene-sulfonic acid, there is produced 2,3-diformyloxypropyl methacrylate which, because of its poor distillability, is used in the form of the crude oil for subsequent polymerization.

e. In a manner analogous to that used in Example 13(b), by the reaction of glycidyl methacrylate, sulfuric acid and butyric anhydride, 2,3-dibutyryloxypropyl methacrylate is obtained. The acrylate is obtained in a corresponding manner. The crude product is used for polymerization without further purification.

EXAMPLE 14

Pentaerythritol Triacetate Methacrylate a. 52 g. of methacrylic acid chloride are added dropwise at 0° C. to a mixture of 131 g. of pentaerythritol triacetate, 150 g. of dry sodium carbonate and 20 g. of copper chloride. The reaction mixture is subsequently stirred for 12 hours at ambient temperature. The product is purified by chromatography on a silica gel column using, as eluent, chloroform with 1 percent methanol. There is thus obtained pentaerythritol triacetate methacrylate, which has a melting point of 28°–30° C. and a boiling point of 142°–145° C./0.01 mm. Hg.

b. Under the same conditions, pentaerythritol triacetate acrylate is produced from pentaerythritol triacetate and acrylic acid chloride.

EXAMPLE 15

2-(2'-Acetoxyethoxy)-ethyl methacrylate 174 g. of diethylene Methacrylate monomethacrylate are dissolved in 306 g. of acetic anhydride and mixed with a few drops of pyridine. The reaction mixture is stirred for 10 hours at ambient temperature. Subsequently, excess acetic anhydride is distilled off and the product distilled under reduced pressure. There is thus obtained 2-(2'-acetoxyethoxy)-ethyl methacrylate which has a boiling point of 78°–79° C./0.01 mm. Hg.

EXAMPLE 16

Diacetin Acrylate 176 g. of technical diacetin are mixed with 32 g. of sodium carbonate and 5 g. of copper chloride, whereafter 90 g. of acrylic acid chloride are added dropwise at 0° C. The reaction mixture is subsequently left to stand for 5 hours at ambient temperature. The reaction mixture is then mixed with chloroform and insoluble material filtered off. After concentration, hydroquinone is added and distillation is continued. An isomeric mixture of diacetin acrylates with a boiling point of 96°–102° C./0.01 mm. Hg is thus obtained.

Diacetin methacrylate is produced in a corresponding manner.

EXAMPLE 17

2-Hydroxy-3-acetoxypropyl Methacrylate and 3-hydroxy-2-acetoxypropyl Methacrylate 328 g. of glycidyl methacrylate are added dropwise, with stirring, to a mixture of 1,000 g. of acetic acid and 30 g. of sodium acetate heated to 100° C. The reaction mixture is subsequently stirred for half an hour at 100° C.

The residue remaining after distilling off the acetic acid under reduced pressure is poured onto ice, and the oil is taken up in chloroform. The chloroform solution is washed neutral with a solution of sodium carbonate, dried over anhydrous sodium sulfate and concentrated under reduced pressure at a bath temperature of 40° C. 440 g. of a colored oil remain behind which, without further purification, is used for the subsequent polymerization. The isomeric mixture of 2-hydroxy-3-acetoxypropyl methacrylate and 3-hydroxy-2-acetoxypropyl methacrylate has a water solubility of 1.3 percent at 23° C.

In an analogous manner, from butyric acid and glycidyl methacrylate, there is produced an isomeric mixture of 2-hydroxy-3-butyryloxypropyl methacrylate and 3-hydroxy-2-butyryloxypropyl methacrylate which is also used for subsequent polymerization without purification.

In a manner directly analogous to those illustrated by Examples 11 to 17, each of the following monomers is prepared from corresponding known starting materials:

2-acetoxyethyl acrylate
3-acetoxy-2-hydroxypropyl acrylate
2-acetoxy-3-hydroxypropyl acrylate
4-acetoxy-2,3-dihydroxybutyl acrylate
4-acetoxy-2,3-dihydroxybutyl methacrylate
2,3-diacetoxybutyl acrylate
2,3-diacetoxybutyl methacrylate
2-(2'-acetoxyethoxy)ethyl acrylate
2-formyloxyethyl acrylate
2,3-diformyloxypropyl acrylate
2,3-dipropionyloxypropyl acrylate
2,3-dibutyryloxypropyl acrylate
2-hydroxy-3-butyryloxypropyl acrylate
3-hydroxy-2-butyryloxypropyl acrylate.

In manner directly analogous to those illustrated by Examples 1 to 8, each of the above-enumerated monomers, as well as those prepared in Examples 11 to 17 is used to prepare gels according to the subject invention. In lieu of the exemplified cross-linking agents an equivalent of each of the following:

ethylene glycol bis-acrylate
diethylene glycol bis-methacrylate
diethylene glycol bis-acrylate
2,2-dimethylpropane-1,3-diol bis-methacrylate
2,2-dimethylpropane-1,3-diol bis-acrylate
butane-1,4-diol bis-acrylate
hexane-1,6-diol bis-acrylate
divinylbenzene
divinylpyridine
ethylene glycol divinylether
butane-1,4-diol divinylether
diallylphthalate
adipic acid divinyl ester
allyl acrylate
allyl methacrylate
allyl methacrylamide
N,N-methylene-bis-acrylamide
vinyl methacrylate
diallyl-dimethylsilane
diallyl sulphone is similarly employed with comparable results. Saponification of the resulting gel is not effected when the cross-linking agent is a diallyl ester or a divinyl ester.

All of the resulting gels are useful in chromatographic separations, such as those of Examples 9 and 10.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:

1. In a gel chromatography method comprising the step of passing a fluid containing at least two different constituents through a gel chromatography bed to separate said constituents, the improvement wherein the gel employed for chromatographic separation is a crosslinked polymer of a compound of the formula

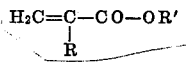

$$H_2C=C-CO-OR'$$
$$|$$
$$R$$

wherein R is hydrogen or methyl; and R' is alkyl having a chain of from 2 to 6 carbon atoms substituted by 1–5 hydroxyl groups, at least one of which is protected by a lower acyl, the alkyl chain being a member selected from the group consisting of a carbon chain, a carbon chain interrupted by one oxygen atom and a carbon chain twice interrupted by oxygen atoms, each interrupting oxygen atom being bound to two carbon atoms.

2. A method according to claim 1 wherein the compound is 2-Acetoxyethyl acrylate.
3. A method according to claim 1 wherein the compound is 2-Acetoxyethyl methacrylate.
4. A method according to claim 1 wherein the compound is 3-Acetoxy-2-hydroxypropyl acrylate.
5. A method according to claim 1 wherein the compound is 3-Acetoxy-2-hydroxypropyl methacrylate.
6. A method according to claim 1 wherein the compound is 2-Acetoxy-3-hydroxypropyl acrylate.
7. A method according to claim 1 wherein the compound is 2-Acetoxy-3-hydroxypropyl methacrylate.
8. A method according to claim 1 wherein the compound is 2,3-Diacetoxy-propyl acrylate.
9. A method according to claim 1 wherein the compound is 2,3-Diacetoxy-propyl methacrylate.
10. A method according to claim 1 wherein the compound is Diacetin acrylate.
11. A method according to claim 1 wherein the compound is Diacetin methacrylate.
12. A method according to claim 1 wherein the compound is 4-Acetoxy-2,3-dihydroxybutyl acrylate.
13. A method according to claim 1 wherein the compound is 4-Acetoxy-2,3-dihydroxybutyl methacrylate.
14. A method according to claim 1 wherein the compound is 2,3-Diacetoxy-butyl acrylate.
15. A method according to claim 1 wherein the compound is 2,3-Diacetoxy-butyl methacrylate.
16. A method according to claim 1 wherein the compound is 2-(2'-Acetoxyethoxy)-ethyl acrylate.
17. A method according to claim 1 wherein the compound is 2-(2'-Acetoxyethoxy)-ethyl methacrylate.
18. A method according to claim 1 wherein the compound is Pentaerythritol triacetate monoacrylate.
19. A method according to claim 1 wherein the compound is Pentaerythritol triacetate monomethacrylate.
20. A method according to claim 1 wherein the compound is 2-Formyloxyethyl acrylate.
21. A method according to claim 1 wherein the compound is 2-Formyloxyethyl methacrylate.
22. A method according to claim 1 wherein the compound is 2,3-Diformyloxypropyl acrylate.
23. A method according to claim 1 wherein the compound is 2,3-Diformyloxypropyl methacrylate.
24. A method according to claim 1 wherein the compound is 2,3-Dipropionyloxypropyl acrylate.
25. A method according to claim 1 wherein the compound is 2,3-Dipropionyloxypropyl methacrylate.
26. A method according to claim 1 wherein the compound is 2,3-Dibutyryloxypropyl acrylate.
27. A method according to claim 1 wherein the compound is 2,3-Dibutyryloxypropyl methacrylate.
28. A method according to claim 1 wherein the compound is 2-Hydroxy-3-butyryloxypropyl acrylate.
29. A method according to claim 1 wherein the compound is 2-Hydroxy-3-butyryloxypropyl methacrylate.
30. A method according to claim 1 wherein the compound is 3-Hydroxy-2-butyryloxypropyl acrylate.
31. A method according to claim 1 wherein the compound is 3-Hydroxy-2-butyryloxypropyl methacrylate.
32. A method according to claim 1 which has a swelling factor within the range of about 2 – 20 milliliters per gram.
33. A method according to claim 32 which has a swelling factor of from 2 – 10 milliliters per gram.
34. A method according to claim 1 wherein the acyl content is at least about 0.3 percent by weight and the acyl is lower alkanecarboxylic acid acyl.
35. A method according to claim 1 which is a pearl polymer.
36. A method according to claim 1 which is cross-linked with a cross-linking agent selected from the group consisting of acrylic diester of polyol containing up to 6 carbon atoms and methacrylic diester of polyol containing up to 6 carbon atoms.
37. A method according to claim 36 wherein the polyol is at least one member selected from the group consisting of ethylene glycol, propylene glycol, butane-1,4-diol and hexane 1,6-diol.
38. A method according to claim 1 wherein from 0.01 – 70 percent by weight thereof is attributable to cross-linking agent.
39. A method according to claim 38 wherein from 0.01 – 20 percent by weight thereof is attributable to cross-linking agent.
40. A method according to claim 38 wherein from 0.1 – 10 percent by weight thereof is attributable to cross-linking agent.
41. A method according to claim 38 wherein from 5 – 70 percent by weight thereof is attributable to cross-linking agent.
42. A method according to claim 38 wherein from 10 – 50 percent by weight thereof is attributable to cross-linking agent.
43. A method according to claim 1 wherein the acyl content is at least about 0.3 percent by weight.

* * * * *